United States Patent [19]

Rees

[11] Patent Number: 4,463,922
[45] Date of Patent: Aug. 7, 1984

[54] SEAT SLIDE STRUCTURE

[75] Inventor: Richard W. A. Rees, West Bloomfield, Mich.

[73] Assignee: General Motors Corporation, Detroit, Mich.

[21] Appl. No.: 491,777

[22] Filed: May 5, 1983

[51] Int. Cl.³ .............................................. F16M 13/00
[52] U.S. Cl. .................................... 248/429; 403/107; 74/536
[58] Field of Search ....................... 248/424, 429, 430; 403/107; 74/533, 536

[56] References Cited

U.S. PATENT DOCUMENTS 2,970,015  1/1961  Ragsdale .
3,171,698  3/1965  Campbell .
3,279,737 10/1966  Krause .
3,350,046 10/1967  Kirk .
3,393,019  7/1968  Fraser .
4,375,905  3/1983  Drouillard .

FOREIGN PATENT DOCUMENTS 2716549 10/1977 Fed. Rep. of Germany ...... 248/429
142039  8/1930 Switzerland ........................ 248/429

Primary Examiner—William H. Schultz
Assistant Examiner—Robert A. Olson
Attorney, Agent, or Firm—Herbert Furman

[57] ABSTRACT

A seat slide structure includes upper and lower interfitting track members, with the upper track member mounting plastic slides to slidably support it on the lower track member for horizontal movement to various adjusted positions. A latch member is movably mounted within the upper track member and includes a first portion interfitting with the slides to locate the latch member laterally of the upper track member and second oppositely extending portions which extend outwardly of the upper track member through vertical elongated openings to locate the latch member longitudinally of the upper track member. The second portions are cooperable with notches of the lower track member to adjustably lock the upper track member in a horizontal position.

3 Claims, 7 Drawing Figures

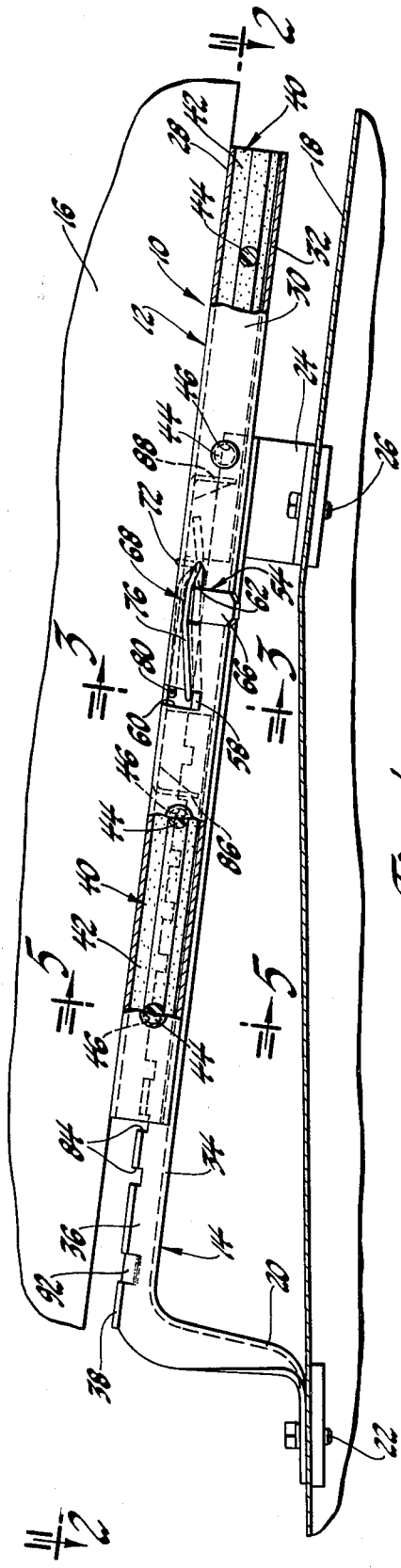

SEAT SLIDE STRUCTURE

This invention relates generally to seat slide structures and more particularly to a seat slide structure for supporting a vehicle seat on the body for movement to a plurality of horizontally adjusted positions.

The seat slide structure of this invention is of the general type including upper and lower generally U-shaped track members which are juxtaposed to each other, with the lower track member being supported on the body and the upper track member being supported on the lower track member by plastic slides for horizontal movement relative thereto. The upper track member houses and movably mounts a latch member. The latch member is located longitudinally and laterally of the upper track member and includes locking portions engageable with locking notches of the lower track member to lock the track members to each other.

One of the features of this invention is that the upper track member is supported on the lower track member by front and rear pairs of plastic slides, with the slides of each pair engaging the base of the upper track member and the legs of the lower track member and being located by interfitting portions of the slides and upper track member. Another feature is that the slides are horizontally elongated and include spaced abutments which extend through openings in the legs of the upper track member for securement thereto. A further feature is that the latch member includes a first portion fitting between one pair of slides to locate the latch member laterally of the upper track member and that the locking portions of the latch member extend laterally outwardly through vertically elongated apertures in the legs of the upper track member so as to locate the latch member longitudinally of the upper track member. Yet another feature is that the latch member includes pivot portions which extend laterally outwardly through horizontally elongated apertures in the legs of the upper track member to pivot the latch member for movement between locked and released positions. Yet a further feature is that a biasing spring acts between the upper track member and the latch member to bias the latch member toward locked position wherein the locking portions thereof engage the locking notches of the lower track member. Still another feature is that the biasing spring includes legs which are located outwardly of the upper track member and have portions thereof extending inwardly of the vertically elongated apertures for engagement of one leg with the latch plate and of the other plate with the base of the upper track member to thereby bias the latch member to locked position.

These and other features of the invention will be readily apparent from the following specification and drawings wherein:

FIG. 1 is a partially broken away side elevational view of a seat slide structure according to this invention;

FIG. 2 is a partially broken away top plan view;

Figure 3:
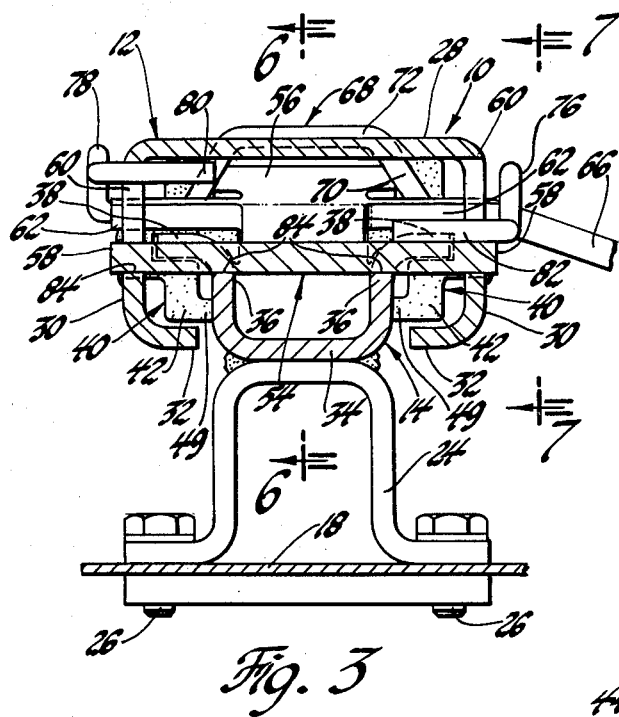
FIG. 3 is an enlarged sectional view taken generally along the plane indicated by line 3—3 of FIG. 1.
Figure 5:
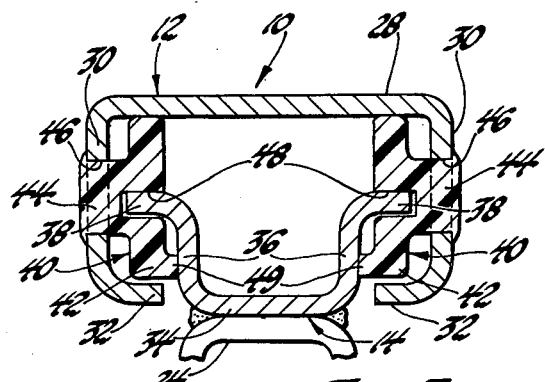
FIG. 5 is an enlarged sectional view taken generally along the plane indicated by line 5—5 of FIG. 1.

Referring now particularly to FIGS. 1, 2, 3 and 5 of the drawings, a seat slide structure designated generally 10 includes an upper generally U-shaped track member 12 and a lower generally U-shaped track member 14. A vehicle seat schematically indicated at 16, FIG. 1, is secured to the track member 12 for horizontal movement therewith relative to the track member 14 as will be further explained. In certain installations, vertical adjustment means may be interfitted between the upper track member 12 and the seat 16, or interfitted between the lower track member 14 and the vehicle floor pan 18. In the embodiment shown, the lower track member 14 is secured to the floor pan 18 by means of an integral front bracket 20 bolted at 22 to the floor pan and a rear bracket 24 welded to the lower track member 14 as shown in FIGS. 3 and 5 and bolted at 26 to the floor pan.

The upper track member 12 includes a base 28 and legs 30 which extend laterally or vertically downwardly from the side edges of the base 28 and terminate in integral inwardly extending flanges 32. The lower track member 14 likewise includes a base 34 and upwardly extending legs 36 which extend laterally from the edges of the base 34 and terminate in flanges 38. The bases 28 and 34 are juxtaposed to each other and likewise the respective pairs of legs 30 and 36 and pairs of flanges 32 and 38 are juxtaposed to each other.

Front and rear pairs of elongated plastic slides 40 are interposed between the base 28 of the upper track member 12 and the flanges 38 of the lower track member 14 in order to slidably support the upper track member 12 on the lower track member 14. As shown in FIGS. 1 and 2, each slide 40 includes a body portion 42 having extending outwardly therefrom a pair of integral abutments or nubbins 44, each of which extends through a circular opening 46 in a leg 30 and is heat staked thereover to locate the slide 40 relative to the upper track member. Each slide includes a continuous longitudinal groove 48, FIG. 5, which receives a flange 38 of the lower track member 14. The engagement of flange 38 with the upper edge of groove 48 and the engagement of each slide with the base 28 of the upper track member slidably supports the upper track member 12 on the lower track member 14. The engagement of ribs 49 of each pair of slides with the legs 36 of the lower track member laterally locates the slides 40 and lower track member 14 relative to each other.

Figure 4:
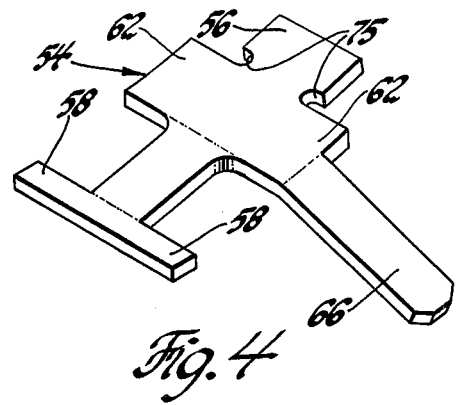
FIG. 4 is a perspective view of the latch member.
Figure 6:
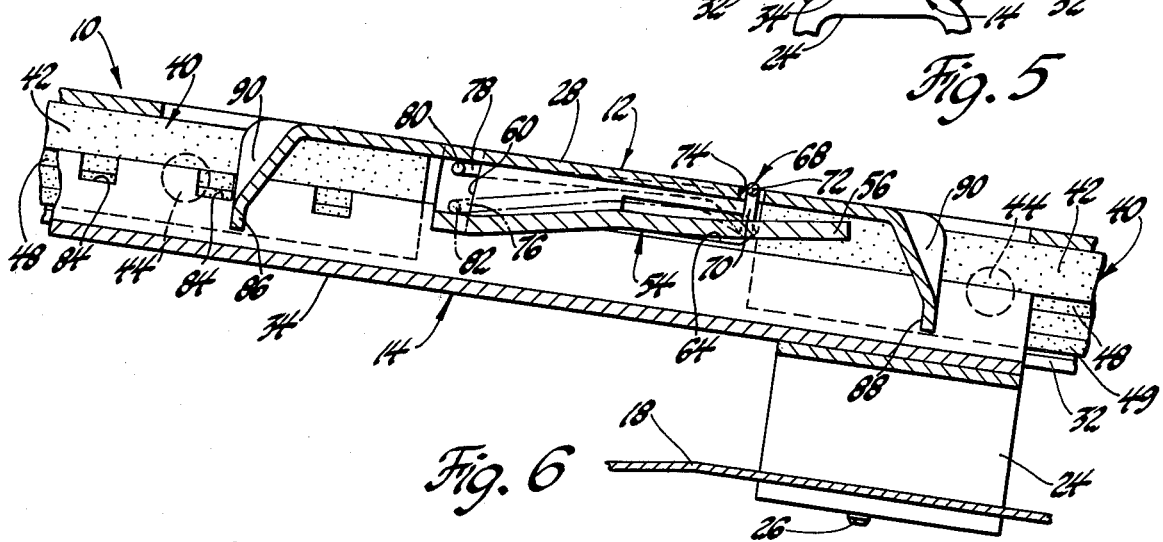
FIG. 6 is a view taken along the plane indicated by line 6—6 of FIG. 3.

A latch plate or member 54, FIG. 4, is located within the upper track member 12 and includes a longitudinally extending lug or first portion 56 which fits between the rear pair of slides 40 as shown in FIG. 6. This interengagement of the portion 56 and the rear pair of slides 40 locates the latch member 54 laterally within the upper track member 12. The latch member 54 further includes a pair of locking lugs or portions 58 which extend oppositely of each other and outwardly of the legs 30 of the upper track 12 through vertically elongated slightly arcuate openings or apertures 60 to thereby guide the latch member in its pivotal movement as will be described and to also locate the latch member longitudinally of the upper track member 12. The latch member 54 also includes a pair of oppositely extending mounting or pivot portions 62 which extend outwardly of the legs 30 of the upper track member 12 through respective horizontal elongated slots 64, FIG. 7, to pivot the latch member 54 to the upper track member 12 for movement between locked and released positions as will be described.

One of the portions 62 includes an extension 66 which provides for a connection of the latch member 54 to a manually operable handle, not shown, for operation of the latch member.

Figure 7:
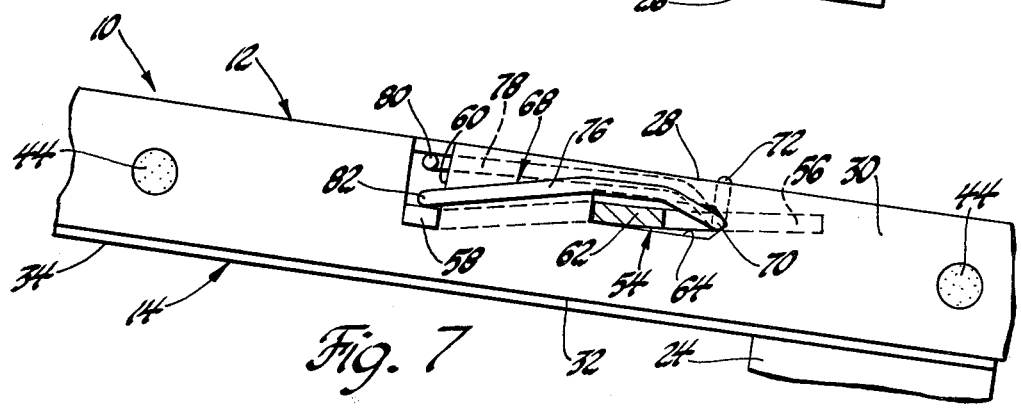
FIG. 7 is a view taken along the plane indicated by line 7—7 of FIG. 3.

A spring 68 includes a base portion 70 which traverses the upper track member 12 as shown in FIGS. 2 and 3 and includes an integral offset portion 72 which extends outwardly of the base 28 of the upper track member 12 through a slot 74 to locate the spring laterally and longitudinally of the upper track member 12. The offset portion straddles the latch member 54 and has the legs thereof extending through slots 75, FIG. 4, between portion 56 and portions 62. The base 70 extends outwardly through the slots 64, member 12. The leg 78 terminates in an inwardly extending integral leg 80 which extends through a slot 60 and engages the base 28 of the upper track member 12, as shown in FIGS. 3, 6 and 7. The leg 76 terminates in an inwardly extending integral leg 82 which extends through the other slot 60 and engages one of the portions 58 of the latch member 54 as also shown in FIGS. 3, 6 and 7. Since the legs 76 and 78 are biased oppositely of each other, the legs exert a bias on the latch plate tending to pivot the latch plate downwardly relative to the upper track member 12 about the floating pivot connections provided by the portions 62 and slots 64 to locked position. This engages the locking portions 58 with one pair of aligned transverse locking notches 84 which are provided in the flanges 38 and adjacent portions of the legs 36 of the lower track member 14. This locks the upper track member 12 in a particular horizontally adjusted position relative to the lower track member 14.

Should it be desired to move the upper track member 12 and the seat 16 to another horizontal position relative to the lower track member 14, the manually operable handle is operated to pivot the latch member slightly clockwise as viewed in FIGS. 6 and 7 as the portions 62 move slightly angularly upwardly to the slots 64. This action occurs against the biasing action of the spring 68. Once the locking portions 58 have cleared the locking notches 84 in the lower track member, the upper track member and the seat can be easily adjusted relative to the lower track member as the upper track member and the front and rear pairs of plastic slides 40 move as a unit relative to the lower track member 14. When the seat is in the desired horizontally adjusted position, the handle is released and the spring 68 returns the latch plate 54 to its locked position wherein the lugs 58 engage a different pair of locking notches 84 of the lower track member 14.

The base 28 of the upper track member 12 as shown in FIGS. 2 and 6 includes a pair of inwardly bent integral lanced tabs 86 and 88 which are reinforced by ribs 90. The engagement of the tab 86 with inwardly bent lanced tabs 92, FIG. 2, of the flanges 38 of the lower track member 14, provides a front stop while the engagement of the tab 88 with similar tabs 94, FIGS. 1 and 6, provides a rear stop.

Thus this invention provides an improved seat slide structure.

The embodiments of the invention in which an exclusive property or privilege is claimed are defined as follows:

1. A seat slide structure comprising, in combination, a first generally U-shaped track member having a base and a leg extending laterally from each side of the base, each leg including an elongated slot, with the slots being aligned transversely of the track member, a second generally U-shaped track member including a base and a leg extending laterally from each side of the base, the base and legs of the second track member being juxtaposed to the base and respective legs of the first track member, slide means spaced transversely of the track members for slidably supporting the first track member on the second track member, the second track member being provided with a longitudinal series of pairs of locking notches in the legs thereof, a latch member movably mounted within the first track member and including a first portion fitting between and cooperably engageable with the spaced slide means to locate the latch member transversely of the first track member, the latch member further including a pair of oppositely extending locking portions, each locking portion extending outwardly of the first track member through a respective elongated slot and cooperably engageable therewith to locate the latch member longitudinally of the first track member, the latch member being movable within the slots between a locked position wherein the locking portions are also received within a pair of locking notches in the legs of the second track member to lock the first and second track members to each other, and a released position wherein the locking portions are movable within the slots out of engagement with such pair of locking notches to permit relative movement of the first and second track members, spring means interposed between the first track member and the latch member to bias the latch member toward locked position, and means for moving the latch member to released position.

2. A seat slide structure comprising, in combination, a first generally U-shaped track member having a base and a leg extending laterally from each side of the base, a vertically elongated slot in each leg of the first track member, a second generally U-shaped track member including a base and a leg extending laterally from each side of the base, the base and legs of the second track member being juxtaposed to the base and respective legs of the first track member, slide means spaced transversely of the track members for slidably supporting the first track member on the second track member, the second track member being provided with a longitudinal series of pairs of locking notches in the legs thereof, a latch member mounted on the first track member and including locking portions extending through the slots for movement between a locked position wherein the locking portions are received within a pair of locking notches of the second track member to lock the first and second track members to each other, and a released position wherein the locking portions are out of engagement with any pair of locking notches to permit relative movement of the first and second track members, spring means seated between the base of the first track member and at least one locking portion of the latch member to bias the latch member toward locked position, and means for moving the latch member to released position.

3. A seat slide structure comprising, in combination, a first generally U-shaped track member having a base and a leg extending laterally from each side of the base, the legs including spaced pairs of transversely aligned elongated slots,
- a second generally U-shaped track member including a base and a leg extending laterally from each side of the base, the base and legs of the second track member being juxtaposed to the base and respective legs of the first track member,
- slide means slidably supporting the first track member on the second track member,
- the second track member being provided with a longitudinal series of pairs of locking notches in the legs thereof,
- a latch member located within the first track member and including spaced pairs of oppositely extending locking and pivot portions, the locking portions extending outwardly of one pair of elongated slots of the first track member to longitudinally locate the latch member within the first track member, the pivot portions extending outwardly of a second pair of elongated slots of the first track member to pivot the latch member to the first track member for movement between a locked position wherein the locking portions are received within a pair of locking notches of the second track member to lock the first and second track members to each other, and a released position wherein the locking portions are out of engagement with any pair of locking notches to permit relative movement of the first and second track members,
- spring means biasing the latch member toward locked position,
- and means for moving the latch member to released position.

* * * * *